April 30, 1963    A. A. HUDIMAC    3,088,062
ELECTROMECHANICAL VIBRATORY FORCE SUPPRESSOR AND INDICATOR
Filed Feb. 10, 1956    7 Sheets-Sheet 1

INVENTOR.
ALBERT A. HUDIMAC
BY George Sipkin
George E. Pearson
ATTORNEYS

April 30, 1963   A. A. HUDIMAC   3,088,062
ELECTROMECHANICAL VIBRATORY FORCE SUPPRESSOR AND INDICATOR
Filed Feb. 10, 1956   7 Sheets-Sheet 2

INVENTOR.
ALBERT A. HUDIMAC
ATTORNEYS

April 30, 1963   A. A. HUDIMAC   3,088,062
ELECTROMECHANICAL VIBRATORY FORCE SUPPRESSOR AND INDICATOR
Filed Feb. 10, 1956   7 Sheets-Sheet 3
Fig. 6a
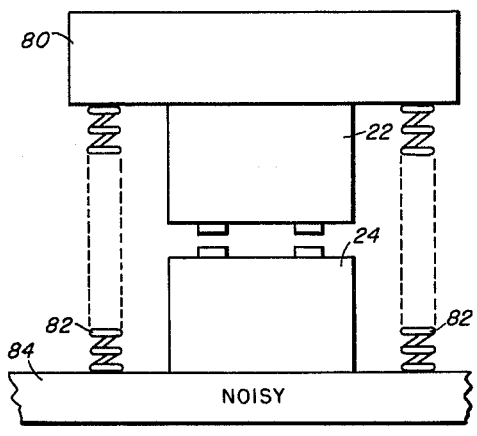
Fig. 7a
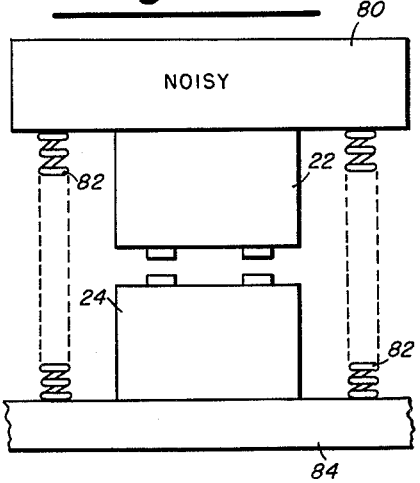
Fig. 6b
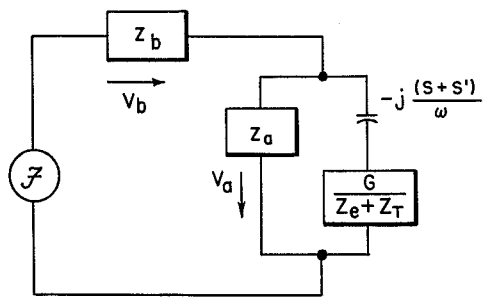
Fig. 7b
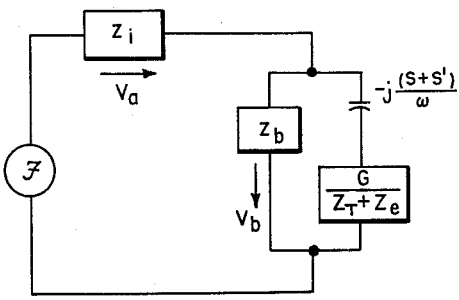
Fig. 8a
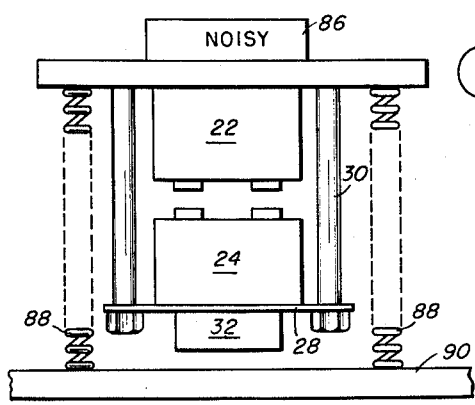
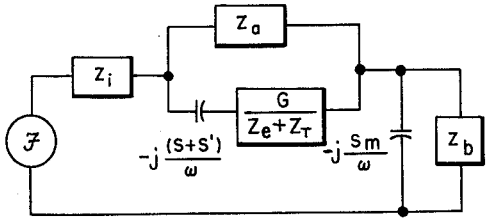
Fig. 8b
INVENTOR.
ALBERT A. HUDIMAC
BY George Sipkin
George E. Pearson
ATTORNEYS

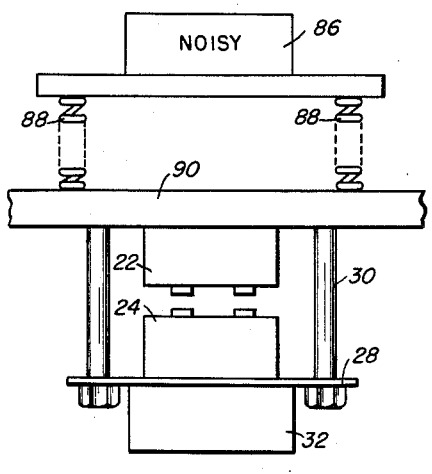
*Fig. 9a*
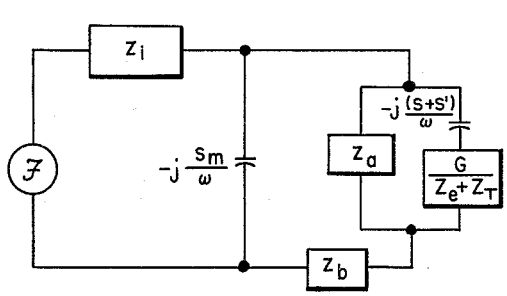
*Fig. 9b*
*Fig. 10a*
*Fig. 10b*
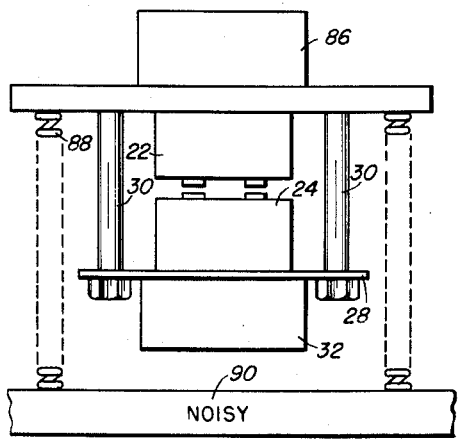
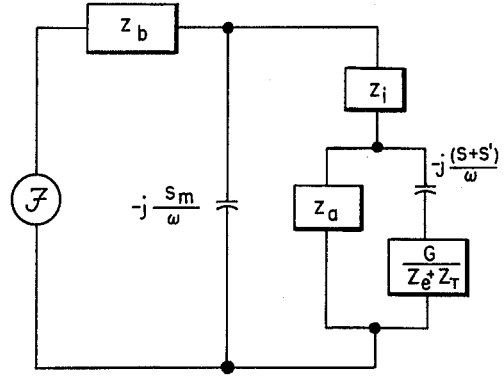
INVENTOR.
ALBERT A. HUDIMAC
ATTORNEYS April 30, 1963   A. A. HUDIMAC   3,088,062
ELECTROMECHANICAL VIBRATORY FORCE SUPPRESSOR AND INDICATOR
Filed Feb. 10, 1956   7 Sheets-Sheet 5

INVENTOR.
ALBERT A. HUDIMAC
BY George Sipkin
George Z. Pearson
ATTORNEYS

April 30, 1963  A. A. HUDIMAC  3,088,062
ELECTROMECHANICAL VIBRATORY FORCE SUPPRESSOR AND INDICATOR
Filed Feb. 10, 1956  7 Sheets-Sheet 6

INVENTOR.
ALBERT A. HUDIMAC
BY George Sipkin
George E. Pearson
ATTORNEYS

INVENTOR.
ALBERT A. HUDIMAC
BY George Sipkin
George E. Pearson
ATTORNEYS

United States Patent Office 3,088,062
Patented Apr. 30, 1963

1

3,088,062
ELECTROMECHANICAL VIBRATORY FORCE
SUPPRESSOR AND INDICATOR
Albert A. Hudimac, 2720 Grandview, San Diego, Calif.
Filed Feb. 10, 1956, Ser. No. 564,835
10 Claims. (Cl. 318—128)
(Granted under Title 35, U.S. Code (1952), sec. 266)

The invention described herein may be manufactured and used by or for the Government of the United States of America for governmental purposes without the payment of any royalties thereon or therefor.

This invention relates to the art which deals with vibratory forces and more particularly to the indication of the characteristics of vibratory forces and the control of vibration of broad frequency ranges and remote adjustment of frequency or frequencies of optimum suppression.

Motion of practically all types of bodies, machines and systems is invariably accompanied by vibration and noise. The desirability of eliminating such vibration and noise has long been recognized and much effort has been directed toward the solution of this problem. The problem is of particular gravity in submarine warfare where a vessel's safety may depend upon the suppression of vibration and noise of the auxiliary equipment which is normally left in operation in ultra-quiet or patrol-quiet conditions.

Mechanical anti-resonant systems comprising springs and masses have been added at suitable places in a vibratable mechanical system to produce a large mechanical impedance at the frequency of anti-resonance of the added elements. Such an arrangement is effective only over a narrow band of frequencies unless it is damped, in which case its effectiveness at resonant frequency is reduced. Further, the resonant frequency is fixed or at least difficult to adjust. Adjustment cannot be effected remotely.

Another known solution is the interposition of resilient means between the element to be protected from vibration and the mechanical element in which the vibration produced force is generated or through which it is transmitted. To work effectively the impedance of such resilient means must be small compared to the impedance of the protected element or of the vibration transmitting element. This requires either springs which are too soft to support the protected machine or the restriction to high frequencies.

The present invention is composed of electrical and mechanical elements having specified properties and embodied in a design such that the electrical elements are transduced into virtual mechanical elements. Certain of the electrical elements may be remotely located and adjustable to effect remote adjustment of virtual mechanical impedance thereof. Further, the electrical elements may be designed to provide electrical impedance which varies with frequency variations of the exciting vibratory forces in such a manner as to maintain over a broad frequency band a virtual mechanical impedance in the system which will produce optimum vibration suppression. More specifically the invention comprises an electro-mechanical transducer which senses the force tending to create vibration of a machine or the base on which the machine is mounted. This exciting force is manifested as a voltage generated by relative motion of two transducer parts which causes a current to flow in a circuit including the transducer and an external electrical impedance. The external impedance adjusts the phase and amplitude of of the current in such a manner as to cause this current to create forces in the transducer which are equal and opposite to the exciting forces. Where neither the machine nor its base is permitted to move transmission of the exciting energy to the system is prevented and the vibratory force is manifested as the motion of one transducer part and its backing mass. The external electrical impedance, the terminal impedance of the transducer, may be specified as a function of vibration frequency for a transducer such that there results a combination of mechanical and virtual mechanical elements which in one case may remain anti-resonant over a broad band of frequencies. In a second case, wherein a machine is resiliently supported from a base, the terminal impedance is so specified as to effect a combination of mechanical and virtual mechanical elements which effectively reduces to zero the dynamic stiffness of the resilient support whereby protection is afforded to the lowest frequencies without impairing the ability of the resilient support to sustain the weight of the machine and withstand shock.

The characteristics of the A.-C. current which flows through the transducer and its terminal impedance, and also the velocity of the moving transducer part are directly proportional to the characteristics of the exciting vibratory forces which may thus be measured by suitable current or velocity indicators.

Accordingly, it is an object of this invention to suppress vibration.

Another object of this invention is the reduction of radiated and self noise of a sea-going vessel caused by transmission of vibration of machines to the hull of the vessel or the passage of the vessel through the water.

Still another object of this invention is the protection of sensitive or fragile equipment from vibration or shock transmitted from its base.

A further object of this invention is the suppression of vibration over board frequency ranges.

Another object of this invention is the remote control of the frequency or frequencies of optimum vibration suppression.

Still another object of this invention is the reduction of the dynamic stiffness of a resilient support without impairing the ability of the support to sustain a load and absorb shock.

A further object of this invention is to maintain the mechanical impedance of a vibratable mechanical system at an extremely high value over a broad frequency range.

Still another object of this invention is to maintain a low impedance motion transmitting path in a vibratable mechanical system down to as low a frequency as is desired.

A further object of this invention is the provision of a vibration suppressor having a structure which is substantially independent of the physical characteristics of the system in which vibration is to be suppressed.

Another object of this invention is to measure vibratory forces.

Still another object of this invention is to indicate the imbalance of a dynamic machine.

Other objects and many of the attendant advantages of this invention will be readily appreciated as the same becomes better understood by reference to the following detailed description when considered in connection with the accompanying drawings wherein:

FIG. 2 is a sectional view of the transducer of FIG. 1a;

FIGS. 6a and 6b show another form of the invention as applied for the purpose of isolating an object resiliently mounted on a noisy base and the equivalent mechanical circuit thereof;

Figure 12:
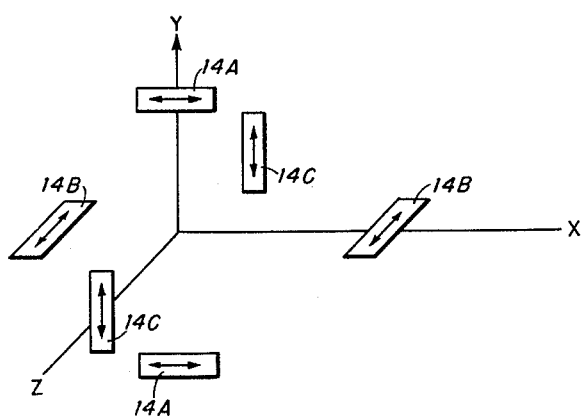
Figure 13:
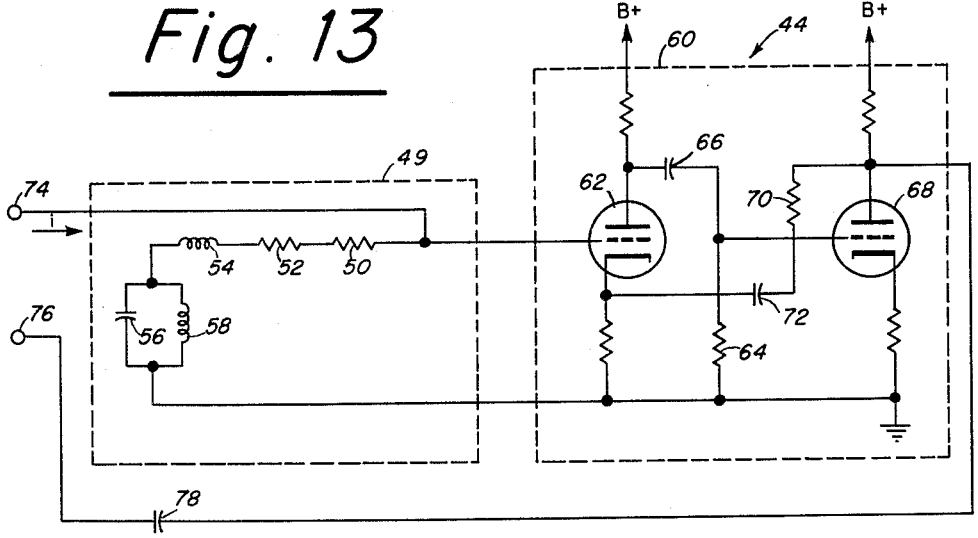
Figure 14:
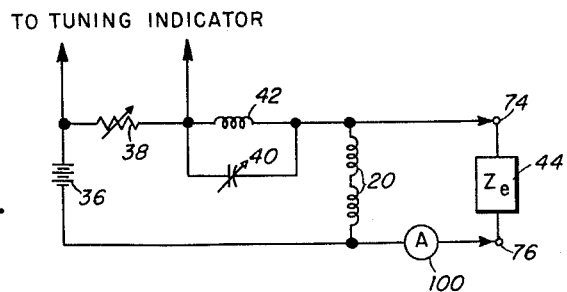
Figure 15:
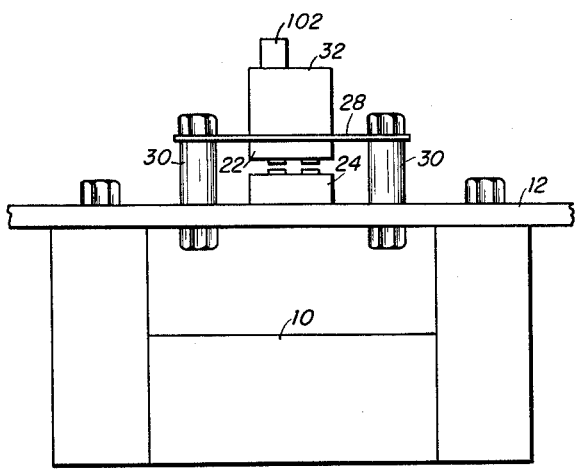
Figure 16:
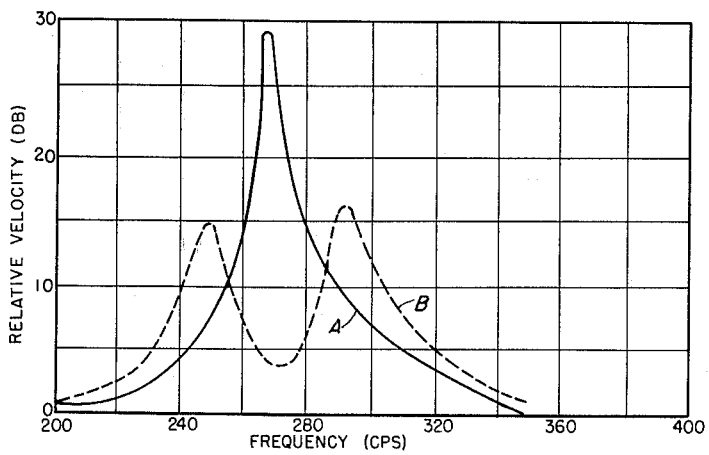
Figure 17:
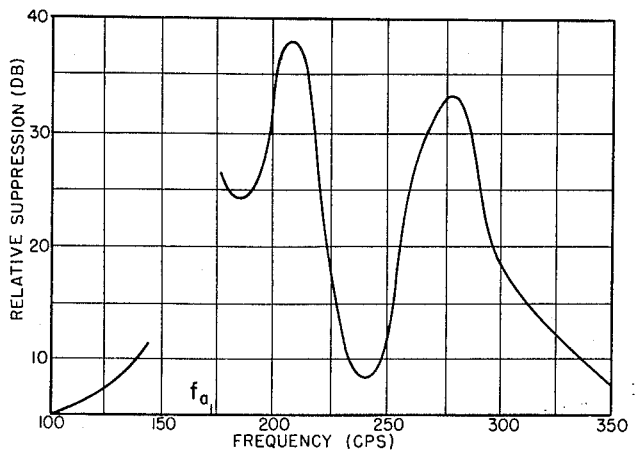
Figure 18:
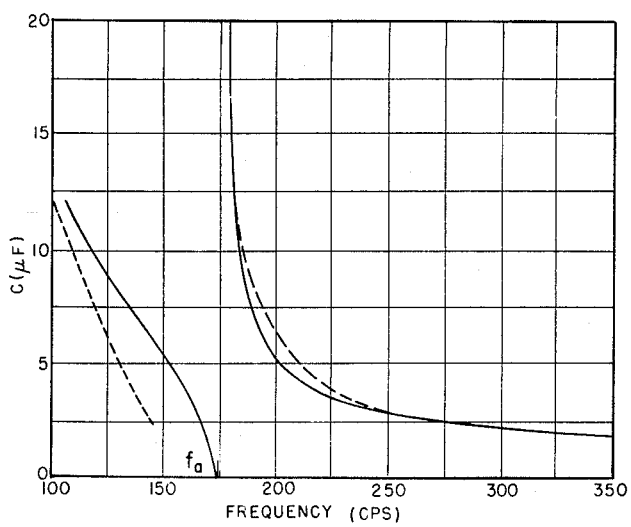

FIGS. 7a–11b inclusive show several additional forms of the invention as applied and the respective equivalent mechanical circuit diagrams thereof;

FIG. 12 diagrammatically depicts the manner in which a number of transducers of this invention may be arranged to suppress vibration in three linear and three rotational directions;

FIG. 13 is a schematic diagram of one circuit which provides a terminal impedance of the type specified;

FIG. 14 is a schematic diagram of the invention modified for use as an indicator of vibratory forces;

FIG. 15 shows another manner in which the invention may be used as an indicator of vibratory forces;

FIGS. 16 and 17 graphically indicate results obtainable with this invention; and FIG. 18 graphically indicates one type of optimum termination.

In the drawings like reference characters refer to like parts.

Figure 1A:
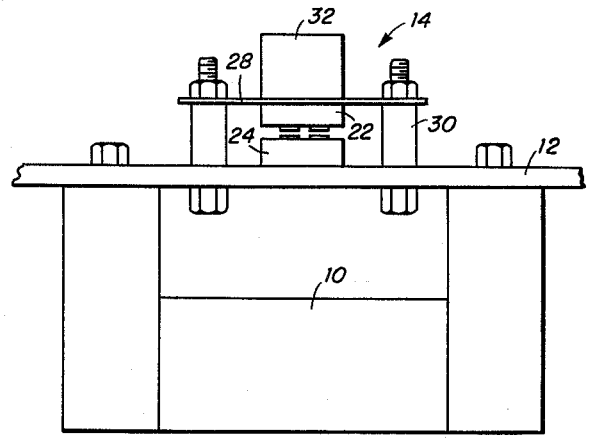
FIGS. 1a and 1b show one form of the invention as applied for the purpose of suppressing vibration of a noisy machine rigidly mounted on a base and the equivalent mechanical circuit thereof.
Figure 3:
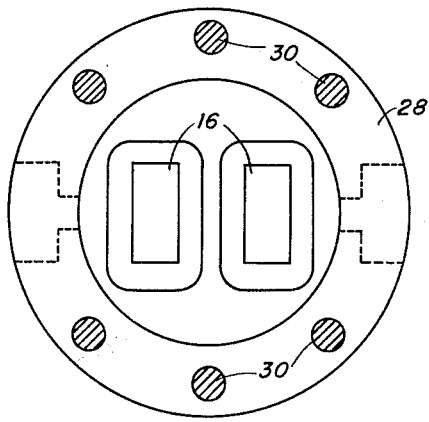
FIG. 3 is a sectional view of part of the structure of FIG. 2.
Figure 2:
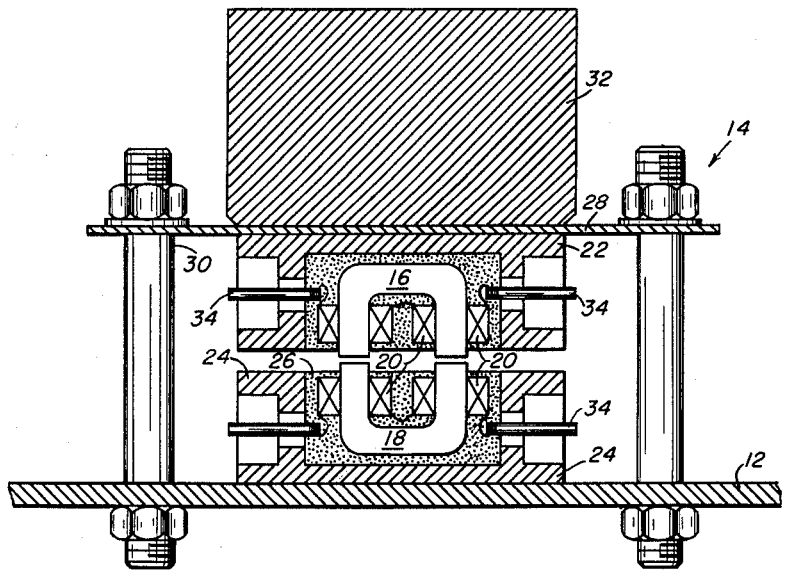

As shown in FIG. 1a, a machine 10 which is "noisy" or vibrates due to dynamic imbalance or other factors is rigidly secured to a base 12 which may be, for example, the hull plate of a vessel or a structural member secured thereto. In this case the source of noise might alternatively be in the base and caused by vibration of other machines or passage of the vessel through the water. The vibration suppressor 14 comprises a variable reluctance transducer having two U-shaped cores 16, 18 (FIGS. 2, 3) of oriented grain ferromagnetic material, each wound with a number of turns of conductive wire 20, mounted in cups 22, 24, and impregnated with potting compound 26 which rigidifies each core, coil and cup assembly. Cup 24 is rigidly secured to base 12 while cup 22 is rigidly secured to a resilient circular plate 28 which may be a stainless steel leaf spring rigidly mounted to base 12 by means of symmetrically arranged studs 30 or the like and fixedly carrying a backing mass or weight 32. Terminals 34 are provided for electrical connection of the coils 20.

The coils 20 of cores 16, 18 are connected in series aiding and excited with a D.-C. current fed from battery 36 (FIG. 4) through variable resistor 38 and a parallel tuned circuit comprising capacitor 40 and inductance 42. The tuned circuit, tuned to vibration frequency, is used to prevent shorting through battery 36 of the A.-C. voltage generated in the coils during operation of the vibration suppressor while a voltage across resistor 38 is conveniently used to supply a tuning indicator (not shown). The described circuit provides a D.-C. magnetic bias. The series connected coils 20 are electrically terminated into a variable electrical impedance 44 to be described hereinafter.

Figure 5:
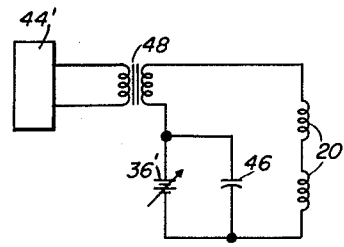
FIG. 5 is a modification of FIG. 4.

An alternative arrangement shown in FIG. 5 shunts the A.-C. voltage of coils 20 across battery 36' by means of capacitor 46 and the coils are coupled with the terminal impedance 44' through a transformer 48. In both arrangements the magnetic bias may be alternatively provided by permanent polarization of the cores, thus eliminating the D.-C. source and tuned rejection filter or the latter may be made broad band.

The described transducer performs two functions simultaneously. First it "senses" the exciting vibratory forces which tend to create vibration of the base 12 and machine 10 and which are manifested as relative motion of the two parts of the transducer and an A.-C. voltage generated thereby. This voltage produces an A.-C. current which flows in a loop through the transducer coils and through the external electrical impedance. The external electrical impedance adjusts the magnitude and phase of the current. The second function is the transduction of the adjusted current into suppressing forces whereby the transducer creates forces (and applies them to the vibratable body, the base and machine) which are equal and opposite to the exciting forces tending to produce the vibration. In effect, the transducer, when properly terminated, presents an exceedingly great impedance to the vibratory exciting forces and, furthermore, will do so over as wide a frequency band as the terminal impedance corresponds to that specified below.

*Analysis*

The condition on the electrical termination is obtained by treating the linearized form for steady state harmonic oscillation. More complicated behavior can be obtained by superposition of these results.

The D.-C. current flowing through the coils of the transducer produces a flux, $\phi_1$, in the cores 16, 18 which can be expressed as $$\phi_1 = \phi_{10} + (\partial \phi_1 / \partial g) \Delta g \tag{1}$$

provided the change in gap or incremental gap width, $\Delta g$, is small compared to the undisplaced gap, $g_0$. Here $\phi_{10}$ is the flux at equilibrium position and $\partial \phi_1/\partial g$ is slope of curve $\phi_1(g)$ at the equilibrium position. Thus, $\phi_1$ has a static component and an A.-C. component. There is an additional A.-C. flux, $\phi_2$, which is caused by the A.-C. current, $i_b$ circulating in the coils due to relative motion of the two transducer parts. It is given by $$\phi_2 = \left[ \frac{4\pi N A}{10(g_0 + \Delta g)} \right] i_b \tag{2}$$

The flux creates a force of traction on the pole faces of the cores, given by $$F = \frac{2(\phi_1 + \phi_2)^2}{8\pi A} = \frac{\phi_1^2}{4\pi A} + \frac{\phi_1 \phi_2}{2\pi A} + \frac{\phi_2^2}{4\pi A} \tag{3}$$

where A is area of each pole face, and where factor of 2 is used because there are two gaps. We shall assume that $\phi_1 \gg \phi_2$. Then substituting from Equations 1 and 2 into 3, and neglecting second order, D.-C. and second harmonic terms, we get $$F = \left[ \frac{\phi_{10} (\partial \phi_1 / \partial g)}{\pi A} \right] \left( \frac{\Delta g}{2} \right) + \left( \frac{2N \phi_{10}}{10 g_0} \right) i_b \tag{4}$$

This force represents a tension on or attraction between each pair of pole faces. Hence, the coefficient of $\Delta g/2$ in the first term on the right represents a pseudo stiffness, $s'$. Because all terms except $\partial \phi_1/\partial g$ are positive, the coefficient $$\left[ \frac{\phi_{10} (\partial \phi_1 / \partial g)}{\pi A} \right]$$

herein designated as $s'$ represents a negative stiffness. A real spring with stiffness $s > s'$ is necessary to maintain a stable undisplaced gap $g_0$. The total tension on each core then is $$F_T = (s + s') \left( \frac{\Delta g}{2} \right) + \left( \frac{2N \phi_{10}}{10 g_0} \right) i_b \tag{5}$$

The force $F_T$ is balanced at each core by forces or reactions peculiar to that core. At the core 18 fastened to the base, the force $F_T$ is balanced against the open circuit force of the machine, $\mathcal{F}$, and the reaction or inertia due to the internal mechanical impedance of the machine, $z_i$, and to the mechanical impedance of the base and parts fixed thereto, $z_b$. The open circuit force of the machine is the force the vibrating machine would exert on an infinitely rigid foundation. Hence, $$F_T = -v_b(z_i + z_b) + \mathcal{F} \tag{6}$$

where $v_b$ is the velocity of the base and of the machine and the positive sense of $\mathcal{F}$, $v_b$ (and later, of $v_a$) being taken from the transducer toward the base. In core 16, the force of $F_T$ is balanced by the reaction due to the mechanical impedance of the core and the mechanical impedance $z_a$ of its backing mass 32. Hence, $$F_T = v_a z_b \tag{7}$$

where $v_a$ is the velocity of mass 32 and core 16.

The change in flux, caused by change in gap and by the circulating current in the transducer, causes a voltage to be induced; it is given by $$E = -N(d\phi/dt) \times 10^{-8} \qquad (8)$$

where E is in volts, $\phi$ is in gauss, and N is the number of turns on the cores. Substitution from Equations 1 and 2 into 8 gives, $$E = -N \times 10^{-8}\left(\frac{\partial \phi_1}{\partial g}\right)\left(\frac{d\Delta g}{dt}\right) - j\omega 4\pi N^2 \left(\frac{10^{-9} \times A}{g_0}\right) i_b \qquad (9)$$

where terms of second order or of second harmonic are neglected. Note that E is taken positive in same direction as $i_b$. Completing the circuit with load $Z_e$, the voltage drop across the load being equal to the induced voltage, $$E = Z_e i_b \qquad (10)$$

where $Z_e$ is the impedance of the electrical termination 44 or 44' of the transducer.

The coefficient of $(-j\omega i_b)$ in Equation 9 is the self inductance of the transducer. An actual transducer will also have an A.-C. resistance, $R_T$, due to windings, eddy currents and hysteresis, and also distributed capacitance. For this reason the coefficient is replaced by $Z_T$, the blocked electrical impedance of the transducer. The blocked impedance may be defined as the impedance with both A.-C. and D.-C. current flowing and the gap held fixed.

$$Z_T = j\omega 4\pi N^2 \left(\frac{10^{-9} \times A}{g_0}\right) + R_T \qquad (10a)$$

We now have three simultaneous Equations in 6, 7, and 10. The desired independent variables are $v_a$, $v_b$ and $i_b$. We therefore express $$\frac{d\Delta g}{dt} = 2(v_b - v_a); \quad \Delta g = \frac{2(v_b - v_a)}{j\omega} \qquad (11)$$

Equations 6, 7, 4, 10 then become:

$$0 = (Z_e + Z_T)i_b + 2N \times 10^{-8}(\partial \phi_1/\partial g)v_b - 2N \times 10^{-8}(\partial \phi_1/\partial g)v_a \qquad (11a)$$

$$\mathcal{F} = \frac{2N\phi_{10} i_b}{10 g_0} + \left[\frac{(s+s')}{j\omega} + z_i + z_b\right]v_b - \left(\frac{(s+s')}{j\omega}\right)v_a \qquad (11b)$$

$$0 = \left(\frac{2N\phi_{10}}{10 g_0}\right) i_b + \left[\frac{(s+s')}{j\omega}\right]v_b - \left[\frac{(s+s')}{j\omega} + z_a\right]v_a \qquad (11c)$$

Equations 11a, 11b and 11c can be written $$\begin{vmatrix} a_{11} a_{12} a_{13} \\ a_{21} a_{22} a_{23} \\ a_{31} a_{32} a_{33} \end{vmatrix} \begin{vmatrix} i \\ v_b \\ v_a \end{vmatrix} = \begin{vmatrix} 0 \\ \mathcal{F} \\ 0 \end{vmatrix}$$

The condition that $v_b$ be zero is that the complementary minor of $a_{22}$ be zero, i.e., $$(Z_T + Z_e)\left[z_a - j\frac{(s+s')}{\omega}\right] = 4N^2 \phi_{10}\left(\frac{\partial \phi_1}{\partial g}\right)\left(\frac{10^{-9}}{g_0}\right) = -G \qquad (12)$$

provided that the determinant of the matrix is not zero. G, a positive number, is herein termed the electromechanical coupling constant. The impedance $$-j\frac{(s+s')}{\omega}$$

is herein defined as the effective mechanical capacitative impedance of the transducer, conveniently designated as $X_{CT}$. In like manner, the condition that $v_a$ be zero is that the complementary minor of $a_{23}$ be zero, i.e., $$(Z_T + Z_e)\left[-j\frac{(s+s')}{\omega}\right] = 4N^2\phi_{10}\left(\frac{\partial \phi_1}{\partial g}\right)\left(\frac{10^{-9}}{g_0}\right)\phi_0 = -G \qquad (13)$$

In this case $z_a$ can be considered as impedance of a machine, which replaces the backing mass and is to be protected from forces transmitted through the base. Since G is a positive number, it is necessary for either case that $(Z_e + Z_T)$ be purely reactive. This requires that the transducer and terminating impedance be lossless. The case of lossy elements will be considered below. It should be emphasized that vibration suppression of base or of the backing mass is obtained for as wide a band of frequencies as Equations 12 or 13, respectively, hold.

Figure 1B:
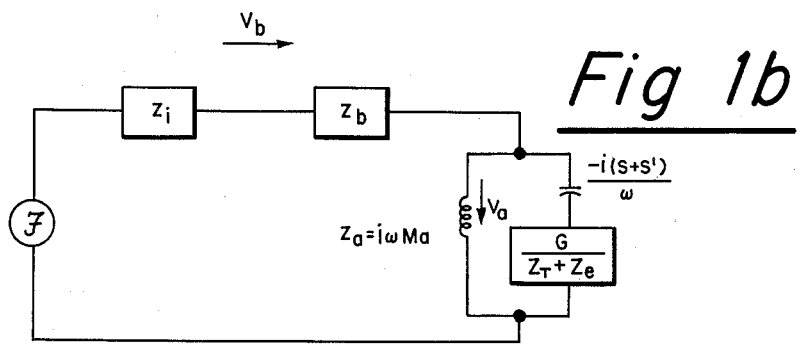

Further insight can be obtained into the conditions for the suppression of oscillations by considering the equivalent mechanical circuit of FIG. 1b. Only the case for the suppression of the vibration of the base is given here. The case for suppression of vibration of the backing mass or an isolated object substituted therefor is very similar. Solving simultaneous Equations 11 for $v_b$ gives $$v_b = \frac{\mathcal{F}\left\{(Z_T+Z_e)\left[z_a - j\frac{(s+s')}{\omega}\right] + G\right\}}{(Z_T+Z_e)\left\{(z_i+z_b)z_a - \left[j\frac{(s+s')}{\omega}\right](z_i+z_a+z_b)\right\} + G(z_i+z_a+z_b)} \qquad (14)$$

The total impedance, z into which the "open circuit force" drives is $$z = \frac{\mathcal{F}}{v_b} = z_i + z_b + z_a - \frac{(Z_T+Z_e)z_a^2}{(z_T+z_e)\left[-j\frac{(s+s')}{\omega} + z_a\right] + G} \qquad (15)$$

Note that if the denominator of the last term is zero, i.e., $$(z_T+z_e)\left[-j\frac{(s+s')}{\omega} + z_a\right] + G = 0 \qquad (12)$$

then z is infinite. Since $\mathcal{F}$ is finite, $v_b$ must be zero, as was demonstrated in the previous paragraph. Equation 15 can be rewritten $$z = z_i + z_b + \frac{z_a\left[-j\frac{(s+s')}{\omega} + \frac{G}{(Z_T+Z_e)}\right]}{z_a + \left[-j\frac{(s+s')}{\omega} + \frac{G}{(Z_T+Z_e)}\right]} \qquad (16)$$

Clearly, z is composed of three impedances in series: $z_i$, $z_b$ and a parallel combination with an impedance of $z_a$ in one branch, and in the other a series arrangement of impedance $$\left[-j\frac{(s+s')}{\omega} + \frac{G}{(Z_T+Z_e)}\right]$$

as shown in the equivalent circuit of FIG. 1b. It will be noted that the condition given by Equation 12 is the condition that the parallel element is anti-resonant. Stated otherwise, the condition that $v_b$ = zero is satisfied by making the mechanical reactance $z_a$ equal and opposite to the mechanical reactance $$G/Z_T + Z_e - \frac{j(s+s')}{\omega}$$

The impedance of the parallel branch in FIG. 1b is infinite at anti-resonance if the elements are not lossy. In practice, this is not possible. Let $$Z_T + Z_e = R + jX$$

where R = the resistance $R_T$ of the actual transducer plus the real component of $Z_e$ and X = the reactive components of $Z_T$ and $Z_e$. Then, $$\frac{G}{Z_e + Z_T} = -j\frac{G}{X} + \frac{GR}{X^2} \qquad (17)$$

provided, as is reasonable, that $X \gg R$. Now the resistance of the parallel circuit at anti-resonance, $R_{ar}$ is $$R_{ar} = \frac{|z_a|^2}{GR/X^2} \qquad (18)$$

Under the condition that $X \gg R$, $$\frac{GR}{X^2} \doteq \frac{GR}{|Z_T + Z_e|^2} = \frac{R}{G}\left|z_a - j\frac{(s+s')}{\omega}\right|^2 \quad (19)$$

where use of condition (12) was made. Hence, $$R_{ar} \doteq \frac{G|z_a|^2}{R\left|z_a - j\frac{(s+s')}{\omega}\right|^2} \quad (20)$$

and Equation 16 becomes $$z = z_1 + z_b + R_{ar} \quad (21)$$

Thus, it is seen that in order to make $R_{ar}$ large, $z_a$ and $G$ should be large, $R$ should be as small as possible and $$\left[z_a - j\frac{(s+s')}{\omega}\right]$$

should be small. This last requirement implies that the resonant frequency of the transducer, $f_a$, be near the frequency range in which suppression is desired. It can be shown that these conditions also result in a small circulating current, $i_b$, and velocity $v_a$. This is desirable because to retain linear operation $i_b$ must be a small fraction of the D.-C. bias current and the displacement must be a small fraction of $g_0$. Furthermore, since $R = R_T$ plus the real component of $Z_e$, $R$ becomes small and $R_{ar}$ large when $RZ_e$ is negative and approaches $R_T$ in magnitude.

It is apparent that the electrical impedances specified above require the use of negative inductances and/or negative capacitances in order to provide impedances which vary with frequency in accordance with Equation 12 or 13. Such elements do not exist in nature but circuits using negative resistance do exist for obtaining such elements. Such circuits are discussed on page 187 of Bode's "Network Analysis and Feedback Design," published in 1951 by Van Nostrand. Negative resistance has been thoroughly studied and a number of such well known circuits are described E. W. Harold in "Negative Resistance and Devices for Obtaining It," Proc. I.R.E., vol. 23, No. 10, October 1935, page 1201.

However, it will be readily appreciated that the invention described herein will effectively suppress vibration in a narrow frequency band when the transducer is electrically terminated in a real, fixed impedance component which has a value determined in accordance with the stated design criteria at the particular frequency of interest. Furthermore, the value of this terminal impedance can be controlled remotely in order to vary the frequency of optimum suppression. The value of G can also be controlled remotely. Thus, for example, the vibration suppressor of this invention may be arranged to effect optimum suppression at one predetermined vibration frequency. If such frequency should for some reason vary from such predetermined frequency the physical arrangement or structure of the suppressor need not be changed. It is merely necessary to change the value of the terminal impedance, which may be a variable capacitor or inductance, at a remote location or to change the value of G by, for example, changing the magnetic bias.

Since broad band vibration suppression is to be desired in many instances the terminal impedance 44 or 44′ may take the form shown in the circuit of FIG. 13 which provides over a broad band an impedance $Z_e$, looking from the transducer coils, of the nature specified in Equations 12, 13.

A series connected impedance 49 comprising resistors 50, 52, inductance 54 and capacitor inductor tank 56, 58 is connected to provide the input to a stable, even stage amplifier 60 (shown with two stages) comprising an electron discharge tube 62 (such as an ordinary vacuum triode) resistance capacitance coupled through elements 64, 66 to electron discharge tube 68. A negative feedback circuit comprising resistor 70 and capactior 72 couples the plate of tube 68 to the cathode of tube 62. Terminal 74 is connected to one end of the series aiding transducer coils 20 while terminal 76, connected to the plate of tube 68 through D.-C. blocking capacitor 78, is connected to the other end of coils 20.

It has been shown that the desired external impedance $$Z_e = -Z_T - \frac{G}{-j\frac{(s+s')}{\omega} + j\omega M_a}$$

where $z_a = j\omega M_a$, the impedance of mass 32. Since both terms on the right are the negative of real impedances, it is clear that $Z_e$ is a negative impedance.

An important class of negative impedance is obtained by employing positive feedback in an amplifier. A species of this class is the series type shown in FIG. 13 which is so connected that the current $i$ flowing through the circuit (and through coils 20) as a whole flows through the amplifier input 49 in series with the amplifier output. The phases are such (with an even number of stages) that the amplifier output tends to increase the current $i$, and thus positive feedback is realized. The negative feedback within the amplifier 60 effected by elements 70, 72, ensures stability of the total negative impedance.

If the amplifier have a gain A and output impedance R, and the voltage applied across terminals 74, 76 be E, the summation of voltages around the series loop gives $$E = iZ_3 + iR_1 - iAZ_3 \quad (22)$$

where $Z_3$ is the impedance of the input 49. Thus, $$E/i = Z_e = Z_3(1-A) + R_1 \quad (23)$$

If A is greater than one the first term on the right is a negative impedance. To determine the value of this negative impedance $Z_3$, for given parameters A and $R_1$, it is only necessary to equate the values of $Z_e$ from Equation 12 and 23

$$Z_3(1-A) + R_1 = -Z_T + G/j\frac{(s+s')}{\omega} - j\omega M_a \quad (24)$$

If $Z_T$ is written $R_T + j\omega L_T$, $Z_3$ becomes $$Z_3 = \frac{1}{A-1}\left[R_1 + R_T + j\omega L_T + \frac{j\omega L(-j/\omega C)}{j\omega L - j/\omega C}\right] \quad (25)$$

where $L = G/s + s'$ and $C = M_a/G$. From Equation 25 it is seen that the circuit whose impedance is $Z_3$ comprises the elements shown within the dotted box 49 where resistor 50 has a value $R_T/A - 1$, resistor 52 is $R_1/A - 1$, inductor 54 is $L_T/A - 1$, capacitor 56 is $C/A - 1$ and inductor 58 is $L/A - 1$.

Thus the circuit of FIG. 13 having components as specified above comprises an impedance into which the transducer may be terminated in order to effect optimum suppression over a band of vibration frequencies of several octaves. With such termination the transducer of this invention in addition to its primary function of steady state vibration or noise suppression, will largely prevent motion of the base and machine due to shock or impulsive noise. This is true by reason of the fact that shock comprises a broad band of vibration frequencies. When $Z_e$ is such that broad band suppression is provided, then that portion of the shock induced motion which is due to those vibration frequencies within the broad suppression band is eliminated. In other words, the broad band vibration suppressor of this invention is also a "shock absorber."

It is to be understood that the circuit of FIG. 13 is but one exemplary embodiment of a terminal impedance which can meet the specified conditions for a wide frequency range. Numerous other circuit arrangements which satisfy the conditions for terminal impedance may be produced in accordance with the stated principles.

Figure 4:
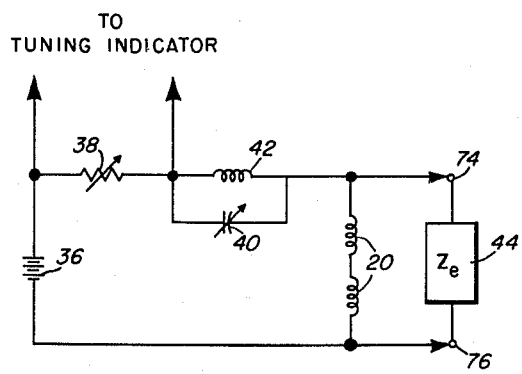
FIG. 4 is a circuit diagram of the electrical connections of the transducer of FIG. 2.

The curves of FIG. 16 indicate exemplary comparative results which are obtainable with the vibration suppressor of this invention. To obtain these curves the structure and circuitry of FIGS. 1a and 4 are employed with a mechanical shaker unit substituted for the noisy machine 10 and a velocity detector is secured to base 12. Curve A represents the values obtained with the transducer unterminated ($Z_e$=infinity) but bias current flowing and curve B represents values obtained with an optimum termination (for the resonant frequency of the system) determined in accordance with the criteria stated above. The parallel LC circuit 40, 42 is tuned to the center of the band of frequencies used. As indicated in FIG. 16 a relative velocity suppression of 26 decibels is obtained at resonant frequency with the optimum termination, a capacitor of 1.9 microfarads. There is a net suppression of vibration over a band width which is 11 percent of central frequency while there is an increase in velocity of vibration outside of this band width with a constant electrical terminal impedance.

At frequencies far removed from the resonant frequency only a few db in vibration suppression were obtained. The reason can be seen with the aid of Equation 21. The quantity ($Z_1+Z_b$) is very large off resonance, while $R_{ar}$ at best is of the same order. This result demonstrates the need for careful application of the design criteria discussed below Equation 21 if good vibration suppression is to be achieved. It is to be understood that while the curves of FIG. 16 corroborate the results indicated by the equations set forth above they are merely indicative of results obtainable with a single transducer in a limited situation and are not intended to limit in any way the scope of the application of this invention to other situations.

Good vibration suppression is obtained at frequencies other than resonant frequencies. FIG. 17 shows the relation between relative suppression of vibration velocity and frequency in a single case. The plot shows that vibration suppression is best at resonant frequencies where ($z_1+z_b$) is small, that suppression increases at the resonant frequency, $f_a$, of the transducer, and that it is significant throughout the frequency band, from 100 to 350 cycles per second.

FIG. 18 shows the relation between values of the terminating capacitor for optimum vibration suppression and frequency for the single case of FIG. 17. The two terminal network of FIG. 13 may substantially fit this curve and thus the vibration suppression indicated in FIG. 17 may be achieved over a wide band of frequencies. The curve of FIG. 18 is the value of a terminating capacitor calculated from Equation 12 and from measured values of G and $Z_T$ for a particular transducer.

An investigation of the conditions of electrical termination of Equations 12, 13 reveals that the terminal impedance $Z_e$ is specified solely as a function of the physical and electrical structure of the transducer and vibration frequency. There is no relation between $Z_e$ and the physical characteristics of the machine and base, the system in which vibration is suppressed, providing only that the change in gap width remain small. Thus, one vibration suppressor of this invention may be applied with equal effectiveness to different mechanical systems with no change of the suppressor required. Large variations in amplitude of vibratory forces can be accommodated, for example, by varying the mass of weight 32.

In the embodiment shown in FIG. 6a an object 80 to be isolated from vibration and shock is mounted through springs 82 on base 84 from or through which vibration and shock are transmitted. The two transducer parts which may be identical to elements 16 through 26 of FIG. 2 and having the same electrical connections and circuitry of FIGS. 4 or 5 are respectively rigidly secured to object 80 and base 84. From the equivalent mechanical circuit of FIG. 6b, where $\mathcal{F}$ is the open circuit force of the noisy base, $z_b$ is the impedance of the base 84, $z_a$ is the impedance of object 80, $s$ is the stiffness of springs 82, $s'$ is the negative stiffness of the transducer and $G/Z_e+Z_T$ is an impedance introduced by the terminated transducer as specified above, the operation of the system can be readily determined. For the desired condition of isolation of object 80, the velocity $v_a$ thereof must be zero. This condition therefore obtains when a low impedance path or mechanical "short circuit" is provided across impedance $z_a$. Such a low impedance path is provided by series resonance in the shunt path which occurs when the reactance $$-j\frac{(s+s')}{\omega}$$

equals reactance $G/Z_e+Z_T$. Thus, isolation is obtained when $$Z_e = -Z_T + G/j\frac{(s+s')}{\omega}$$

The action of this type of suppressor may be explained as follows: The vibratory exciting force tends to vibrate object 80 by exerting a force through real springs 82. When a force is exerted across the springs there is relative motion between the two transducer parts which induces a voltage in the coils thereof. Thus a current is caused to flow through the coils and the terminal impedance (not shown in FIG. 6a). If the termination is as specified the resulting current has just the proper magnitude and phase as to cause a force to be exerted by the core attached to the object 80 (and of course on the other core) which will exactly cancel the force of the springs on the object. The object thus has zero net force acting upon it and so remains stationary. It will be seen that the arrangement of FIG. 6a with the specified termination effectively reduces, and even entirely removes over a wide band of frequencies, the dynamic stiffness of springs 82 which support object 80. However, the ability of the springs to support a heavy object and to withstand shock remains unimpaired.

In the arrangement of FIG. 6a, a lossy transducer does not prevent reduction of the dynamic stiffness to zero but does replace such stiffness with a resistance $R_s$ given approximately by $$R_s = R/G\left(\frac{s+s'}{\omega^2}\right)$$

and thus it is seen that G should be large and R small to make $R_s$ small.

From FIG. 6b it can be seen that vibration of the base 84, and of any device rigidly secured thereto is prevented when $v_b$ is zero, a condition which occurs when an infinite impedance is provided by anti-resonance of the parallel tank circuit. Therefore, the terminal impedance is specified by equating $z_a$ to the sum of $G/Z_e+Z_T$ and $$-j\frac{(s+s')}{\omega}$$

Of course, with such termination, object 80 will vibrate.

The structure and arrangement of the system shown in FIG. 7a is the same as that of FIG. 6a but in the former the source of noise is object 80 which may be a noisy machine. The equivalent mechanical circuit of the system of FIG. 7a, shown in FIG. 7b, is substantially similar to that of FIG. 6b and $\mathcal{F}$ still represents the exciting vibratory force which is now the open circuit force of the machine 80. The position of the impedances representing base and machine or object are interchanged in the equivalent circuit. Where the noisy machine is to be prevented from vibrating the terminal impedance is specified by $$(Z_T+Z_e)\left[z_b - j\frac{(s+s')}{\omega}\right] + G = 0$$

Where transmission of vibration to the base is to be prevented the terminal impedance is specified by $$(Z_e+Z_T)\left(j\frac{s+s'}{\omega}\right) - G = 0$$

As shown in FIG. 8a and 9a, the arrangement of FIG. 1a can be utilized with a noisy machine 86 supported by springs 88 on a base 90 with the suppressor mounted on either the machine (FIG. 8) or base (FIG. 9). In the mechanical equivalent circuits of FIGS. 8b and 9b, $z_1$ is the impedance of the machine 86, $z_a$ is the impedance of mass 32, $s$ is the stiffness of leaf spring 28 and $s_m$ is the stiffness of springs 88. In either case the termination is the same as that specified in Equation 12. With this termination it will be seen that an infinite impedance is presented to the existing force when the transducer is mounted on the machine since the parallel tank circuit is anti-resonant (FIG. 8b). Therefore, vibration of both machine 86 and base 90 is prevented.

With the transducer mounted on the base the latter is in series with the infinite impedance of the tank circuit while velocity of the machine is shunted across the base by springs 88. Therefore the base remains still and the machine behaves as if the springs 88 were mounted on an infinitely rigid base.

Figure 11A:
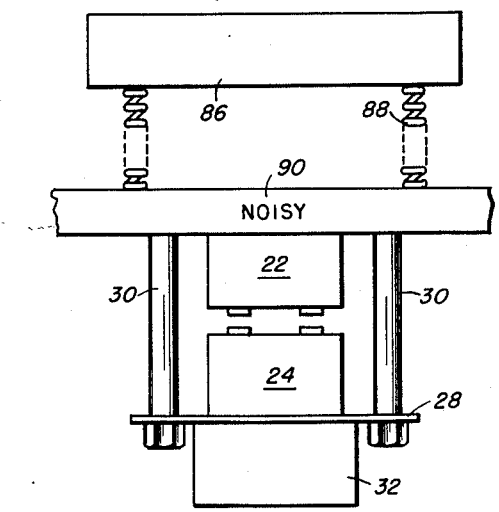
Figure 11B:
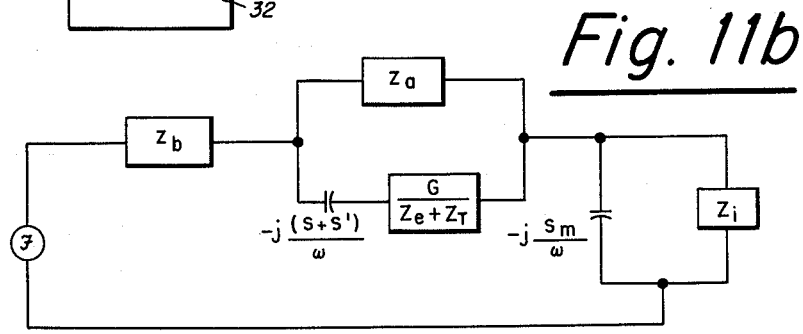

The arrangements of FIGS. 10a and 11a are respectively the same as those of FIGS. 8a and 9a but the source of noise in the former is in the base. The termination remains as specified in Equation 12. With the transducer attached to the machine (FIGS. 10a, 10b) an infite impedance is presented by the tank circuit to velocity of the machine while velocity of the base is shunted across the machine by springs 88. Here the base may vibrate but the machine is still. With the transducer attached to the noisy base (FIGS. 11a, 11b) an infiite impedance is presented to the exciting vibratory force by the anti-resonant tank circuit. Thus, as in the arrangement of FIG. 8a and of FIG. 1a vibration of both the machine and base is prevented by reason of the fact that no transfer of energy of the exciting force to the suppressed system is possible.

While the analysis and description which appears above has been confined to a vibration suppressor embodying a variable reluctance transducer it will be readily appreciated that the principles of the invention are equally applicable to other types of electromechanical transducers. For example, in the case of the moving coil type of transducer where the moving coil is used in place of one core and the field structure in place of the other it can be demonstrated that the results are the same as for the variable reluctance transducer, except that the negative stiffness thereof, $s'$, is zero and the electromechanical coupling constant G is defined as $$G = B^2 l^2 \times 10^{-9}$$

where B is flux density in the gap occupied by the moving coil and $l$ is total length of wire of the moving coil in the magnetic field.

Similar analyses using lumped parameters could be made for still other types such as electrostatic, tangential variable reluctance and tangential electrostatic. A somewhat more complicated device using magnetostrictive or piezoelectric transducers could be used. In these types the generated forces, mass and stiffness are not lumped and hence analysis is more complicated, but the basic principles still apply.

In the discussion thus far, the forces treated have been unidirectional linear oscillations and they tend to give rise to unidirectional displacements. In the general case of a rigid machine, there can be three mutually perpendicular components of linear vibration and three mutually perpendicular components of rotational vibration. To suppress all such components would require six of the described suppressors 14, as diagrammatically illustrated in FIG. 12, which are arranged in three pairs, 14A, 14B, and 14C with the pairs A, B, C being oriented mutually perpendicular to each other. Thus the transducers of one pair, with axes of vibration (or linear vibration suppression) parallel and separated by a suitable distance would take care of one linear and one rotational mode of vibration, when the magnitude, phase and points of application of the suppressor forces created by the transducers of such pair are such that the moment of force exerted by the pair of suppressor forces is equal to the rotational moment of the particular mode of vibratory rotational exiting force and the phase and magnitude of the resultant linear suppressor forces are opposite and equal to the exciting force in the one linear mode. Pair 14A would suppress linear vibration parallel to the X axis of FIG. 12 and rotational vibration about the Z azis. Pair 14B would suppress linear vibration parallel to the Z axis and rotational vibration about the Y axis. Similarly, pair 14C would suppress linear vibration parallel to the Y axis and rotational vibration about the X axis. Obviously a suitable subcombination of the transducers shown in FIG. 12 may be selected to suppress any subcombination of the possible vibrational modes.

In recapitulation, it may be stated that the vibration suppressor described herein performs the fundamentally desired function of providing a vibratable mechanical system with an effective mechanical impedance which may be maintained at an optimum value over a broad frequency range and may be remotely adjusted. Depending upon the particular system and the results desired this function is performed in one of two ways. In one case there is provided in the system an extremely high mechanical impedance which prevents transfer of energy. Alternatively, there is provided an extremely low impedance series resonant motion transmitting path, down to frequencies as low as desired, which shunts the velocity of a part in which vibration is to be prevented.

Measurement of Vibration

As will be shown below each of the quantities $i_b$, the adjusted A.-C. current flowing through the transducer coils and the terminal impedance, and $v_a$, the velocity of one moving transducer part is directly proportional to the exciting vibratory force and the suppressor forces created by the transducer. Therefore, to measure the magnitude of the exciting force it is merely necessary to measure this current or velocity. Thus, to measure the open circuit force, or imbalance of machine 10 of FIG. 1a, it is merely necessary to provide a suitable current indicating device such as the ammeter 100 shown in FIG. 14 in the transducer coil circuit. Alternatively, as shown in FIG. 15, a conventional velocity detector 102, well known in the art, may be mounted on the moving transducer part or the mass 32 fixed thereto. The reading of detector 102 or ammeter 100 is directly proportional to the exciting force and the indicators may be so calibrated as to yield direct measurements of the unknown forces. It is to be understood that FIGS. 14 and 15 show circuits and structures which may be identical with those of FIGS. 4 and 1a respectively save for the addition of elements 100 and 102.

As will be readily appreciated each of the embodiments or applications described herein may be modified by addition of either a current or velocity detector, or both, to provide apparatus for measuring vibratory forces. It will be seen that in addition to the linear relation between magnitude of exciting forces and either current or velocity, there is a linear relation between the frequencies and phases thereof and these characteristics of the exciting forces may be measured by measuring frequency and phase of current or velocity. For example, the ammeter 100 may be replaced with a suitable frequency or phase detector or the latter may be provided in addition to the ammeter.

Analysis

When the external electrical termination of the transducer is chosen so as to suppress vibration of the base, the open circuit force, $\mathcal{F}$ is effectively transferred to the total backing mass. This can be seen by noting that, when the velocity of the base is zero, the forces produced by the transducer cancel the force in the machine. This bucking force is obtained in part from the traction on the base core and in part due to the strain on the (dynamic) spring. The traction on the backing mass core is equal and opposite to that on the base core; the reaction of the (dynamic) spring on the backing mass is opposite to its reaction on the base. Hence the forces exerted on the total backing mass are opposite to the bucking forces. Since the bucking forces are equal and opposite to the open-circuit force of the machine, the force on the backing mass is equal to the open-circuit force.

This can be proved rigorously by solving Equations 11a, 11b, 11c for $v_a$ and then imposing the condition for $v_b=0$, i.e., Equation 12. The result is $$Va)_{v_b=0} = \mathcal{F}/z_a$$

Clearly, then, if the total backing mass is known, and if $v_a$ for the condition $v_b=0$ is known, $\mathcal{F}$ is given by the product of these two values, i.e.

$$\mathcal{F} = z_a n_a)_{v_b=0}$$

When the external electrical termination of the transducer is chosen so as to suppress the vibration of the base, the current circulation through the loop formed by the transducer and the external electrical termination is of such a magnitude and phase that it creates a force in the transducer to buck out the open circuit force.

If Equations 11a, 11b, and 11c are solved for $i_b$ and then the condition for $v_b=0$ are imposed (i.e., Equation 12), the result is $$i_b = \mathcal{F}\frac{2N \times 10^{-8} \partial \phi_1/\partial g}{(Z_e + Z_T)z_a}$$

But by Equation 12

$$-G = (Z_T + Z_e)\left[z_a - j\frac{(s+s')}{\omega}\right]$$

and $$-G = 4N^2 A \phi_{10}\left(\frac{10^{-9}}{g_0}\right)\left(\frac{\partial \phi}{\partial g}\right)$$

Therefore $$\mathcal{F} = \frac{i_b}{g_0/A_0 N \times \frac{10}{2}\left[1 - \frac{s+s'}{M_a} \times \frac{1}{\omega^2}\right]}$$

All of the quantities in the denominator on the right hand side can be determined. The current, $i_b$, can be determined by measuring the voltage drop across a small resistor placed in series with the external electrical termination such as the ammeter of FIG. 14.

Note that the machine vibration of which is to be measured need not be placed on any particular test mount. Specifically, it can be "in situ," i.e., in the place that the machine is actually used.

Obviously many modifications and variations of the present invention are possible in the light of the above teachings. It is therefore to be understood that within the scope of the appended claims the invention may be practiced otherwise than as specifically described.

What is claimed is:

1. A transducer comprising a pair of cores of magnetic material, a coil on each core, spring means resiliently interconnecting said cores, means for energizing said coils in series aiding to produce a steady magnetic bias, and electrical circuit means connected with said coils, said circuit means having an electrical impedance which effectively provides said transducer with a high mechanical impedance.

2. The structure of claim 1 wherein said electrical impedance is a negative impedance determined in accordance with the characteristics of the transducer and varies with frequency whereby the mechanical impedance of said transducer remains high over a broad band of frequencies.

3. The structure of claim 1 wherein said circuit means includes means for varying said electrical impedance with frequency in accordance with the tendency of said mechanical impedance to vary with the frequency whereby the mechanical impedance of said transducer remains high over a broad band of frequencies.

4. A transducer comprising a pair of cores of magnetic material, a coil on each core, spring means resiliently interconnecting said cores, means for energizing said coils in series aiding to provide a steady magnetic bias, and electrical circuit means connected with said coils for providing said transducer with a low effective mechanical impedance.

5. The structure of claim 4 wherein said circuit means includes means for providing a negative electrical impedance in said circuit.

6. The structure of claim 4 including means in said circuit for varying the electrical impedance thereof in accordance with the tendency of said mechanical impedance to vary with frequency.

7. A transducer comprising a pair of cores of magnetic material, a coil on each core, spring means resiliently interconnecting said cores, means for energizing said coils in series aiding to produce a steady magnetic bias, and electrical circuit means connected with said coils, said circuit means having an electrical impedance which effectively provides said transducer with a high mechanical impedance, said circuit means including means for indicating the current therein.

8. A transducer comprising a pair of cores of magnetic material, a coil on each core, spring means resiliently interconnecting said cores, means for energizing said coils in series aiding to produce a steady magnetic bias, electrical circuit means connected with said coils, said circuit means having an electrical impedance which effectively provides said transducer with a high mechanical impedance, and means for indicating the relative velocity of said cores.

9. The structure of claim 7 wherein said circuit means includes means for varying said electrical impedance with frequency in accordance with the tendency of said mechanical impedance to vary with the frequency whereby the mechanical impedance of said transducer remains high over a broad band of frequencies.

10. The structure of claim 8 wherein said circuit means includes means for varying said electrical impedance with frequency in accordance with the tendency of said mechanical impedance to vary with the frequency whereby the mechanical impedance of said transducer remains high over a broad band of frequencies.

References Cited in the file of this patent

UNITED STATES PATENTS

| | | |
|---|---|---|
| 1,535,527 | Harrison | Apr. 28, 1925 |
| 1,535,538 | Maxfield | Apr. 28, 1925 |
| 1,997,423 | Loser | Apr. 9, 1935 |
| 2,136,219 | Scherbatskoy | Nov. 8, 1938 |
| 2,226,571 | McGoldrick | Dec. 31, 1940 |
| 2,302,219 | Hostetler | Nov. 17, 1942 |
| 2,484,022 | Esval | Oct. 11, 1949 |
| 2,660,062 | Frowe | Nov. 24, 1953 |
| 2,722,194 | Hoffman | Nov. 1, 1955 |
| 2,776,560 | Erath | Jan. 8, 1957 |
| 2,788,457 | Griest | Apr. 9, 1957 |